United States Patent [19]

Weissbach

[11] Patent Number: 5,568,841
[45] Date of Patent: Oct. 29, 1996

[54] REAR FRAME FOR CENTER PIVOT STEERED CONSTRUCTION MACHINERY

[75] Inventor: Thomas Weissbach, Ausburg, Germany

[73] Assignee: O&K Orenstein & Koppel Aktiengesellschaft, Berlin, Germany

[21] Appl. No.: 353,267

[22] Filed: Dec. 5, 1994

[30] Foreign Application Priority Data

Dec. 3, 1993 [DE] Germany ............... 43 41 286.6

[51] Int. Cl.⁶ ............................................. B62D 21/00
[52] U.S. Cl. ..................... 180/311; 180/418; 280/781
[58] Field of Search ........................ 180/311, 312, 180/134, 135; 280/781, 782, 792; 296/203, 204

[56] References Cited

U.S. PATENT DOCUMENTS

| | | | |
|---|---|---|---|
| 3,328,049 | 6/1967 | Luterbach | 280/515 |
| 3,754,615 | 8/1973 | McIndoo et al. | 180/311 X |
| 4,027,913 | 6/1977 | Youngers et al. | 296/191 |
| 4,087,101 | 5/1978 | Shimazaki et al. | 280/834 |
| 4,342,470 | 8/1982 | Matsuda | 296/204 X |
| 5,114,207 | 5/1992 | Nakajima et al. | 296/204 |

FOREIGN PATENT DOCUMENTS

| | | |
|---|---|---|
| 239069 | 3/1965 | Austria . |
| 0311853 | 4/1989 | European Pat. Off. . |
| 0533118 | 3/1993 | European Pat. Off. . |
| 1157941 | 11/1963 | Germany . |
| 2649885 | 7/1977 | Germany . |
| 2905529C2 | 3/1988 | Germany . |

*Primary Examiner*—Kevin Hurley
*Attorney, Agent, or Firm*—Spencer & Frank

[57] ABSTRACT

A rear frame for center pivot steered construction machinery which, for receiving adjacent machine parts or subassemblies, is formed of components extending in the longitudinal direction of the frame and constitute bearing components which can be connected with each other by further transversely extending components. When assembled, the result is a basic structure in the shape of a box which is closed or can be closed by machine parts or adjoining subassemblies.

19 Claims, 2 Drawing Sheets

REAR FRAME FOR CENTER PIVOT STEERED CONSTRUCTION MACHINERY

REFERENCE TO RELATED APPLICATIONS

This application claims the priority of German application Serial No. P 43 41 286.6, filed Dec. 3, 1993, which is incorporated herein by reference.

BACKGROUND OF THE INVENTION

The invention relates to a rear frame for center pivot steered construction machinery, in particular for wheel loaders, wheel dozers, compactors, or the like, which, for receiving adjacent machine parts or subassemblies, is formed of components extending in the longitudinal direction of the frame and which can be connected with each other by means of further transversely extending components.

DE-C 29 05 528 relates to a vehicle, in particular a front-end loader, with at least one steering axle and pivotable rear wheels, and with a rigid frame composed of longitudinal and transverse beams which supports the vehicle body and the engine, has a center frame section extended downward between the wheels and essentially consists of an exterior frame part and an interior frame part partially extending between its lateral longitudinal beams, wherein the interior frame part extends portal-like over the rear wheels of the vehicle, and the interior frame part, comprising one or two longitudinal beams, extends between the axles of the front and rear wheels. In the area of the center frame section, both frame parts are disposed at the height of the floor of the driver's position. The engine is seated within the exterior frame part behind the rear wheels on the one side on supports at the back end of the interior frame part and on the other side on supports of the rear end of the exterior frame part. Even though this is not a center pivot steered construction vehicle, the arrangement of longitudinal and transverse beams is often employed in connection with such vehicles. In this case it should be noted as being disadvantageous that there results a quasi punctiform force introduction into the lateral frame walls on account of this lamella-like type of construction, which requires an appropriate dimensioning of the components to achieve the necessary rigidity of the frame. Furthermore it should also be noted as disadvantageous that it is necessary to provide a comparatively elaborate encapsulation of the engine because of the beam-type construction of the frame.

The object of the invention on the one hand is to reduce the weight of the components of the rear frame for optimizing the load distribution over the entire machinery as well as for simplifying of its handling during the manufacturing process and, on the other hand, to cause an optimized encapsulation of the drive assembly to improve the environmental compatibility of the machinery.

SUMMARY OF THE INVENTION

The above object generally is attained in accordance with the present invention in that the longitudinally extending components as well as those extending transversely thereto are embodied as surface elements which, when assembled, result in a basic structure allowing a linear integration of the structural parts in the form of a box which is closed or can be closed by machinery parts, adjoining subassemblies or similar components.

Advantageous further features of the subject of the invention ensue from the description of the invention and from the dependent claims.

In connection with the instant attainment of the object of the invention, a closed box, assembled from surface elements (plates), is selected as the basic structure of the rear frame. It is embodied in such a way that the introduction of exterior forces takes place at corners (bearings of the rear axle and driver's cab) or at edges (pivot hinge) of the box. The lateral surface elements extending in the longitudinal direction of the rear frame are embodied as bearing components analogous to those extending transversely. Based on the linear integration of all surface elements, all cross sections of the rear frame represent composite cross sections with a combined increased geometric moment of inertia. This allows a considerable reduction of the component weight by up to 25% with the same carrying capacity of the structure as well as the use of the same materials and application of the same production methods as with conventional structures formed of longitudinal and transverse beams.

The entire rear frame is furthermore designed in such a way that it encloses the drive assembly (transmission, converter, pumps, engine, etc.) of the construction machinery to the greatest extent and, where this is not the case or not possible, it is provided with level flange areas which permit a sealing connection of adjoining machine parts or subassemblies. Optimized sound proofing is achieved by means of this arrangement in comparison with the state of the art.

It is of further advantage that due to of its closed structure, the rear frame is used as a catch basin in case of leakage of the components disposed in it. Furthermore, because of the complete encapsulation, environmental effects are kept away from the drive train, besides a not inconsiderable lowering of noise emissions, so that under these circumstances it would be convenient to design the required lubrication points as lifetime lubrication, i.e. low maintenance or no maintenance, based on the service life of the construction machinery.

The surface elements of the rear frame take on a support functions as well as a casing function. Function-related openings in the surface elements of the rear frame are arranged in such a way that the support function of the surface elements is not hampered and that the openings can be sealingly closed with little effort. It is possible by means of suitable constructive measures to either avoid completely or to minimize structurally required openings for components extending from the interior of the rear frame into the open (cardan shafts, steering cylinders, hoses or the like).

As already described, it is possible because of the described design of the rear frame to reduce its structural weight considerably and to optimize the load distribution over the entire machine in this way. At the same time the outlay for casing parts for encapsulating the drive assembly is considerably reduced by the design of the rear frame without increasing its manufacturing expense.

An exemplary embodiment of the subject of the invention is shown in the drawings and will be described in detail below.

DETAILED DESCRIPTION OF THE PREFERRED EMBODIMENT

Figure 1:
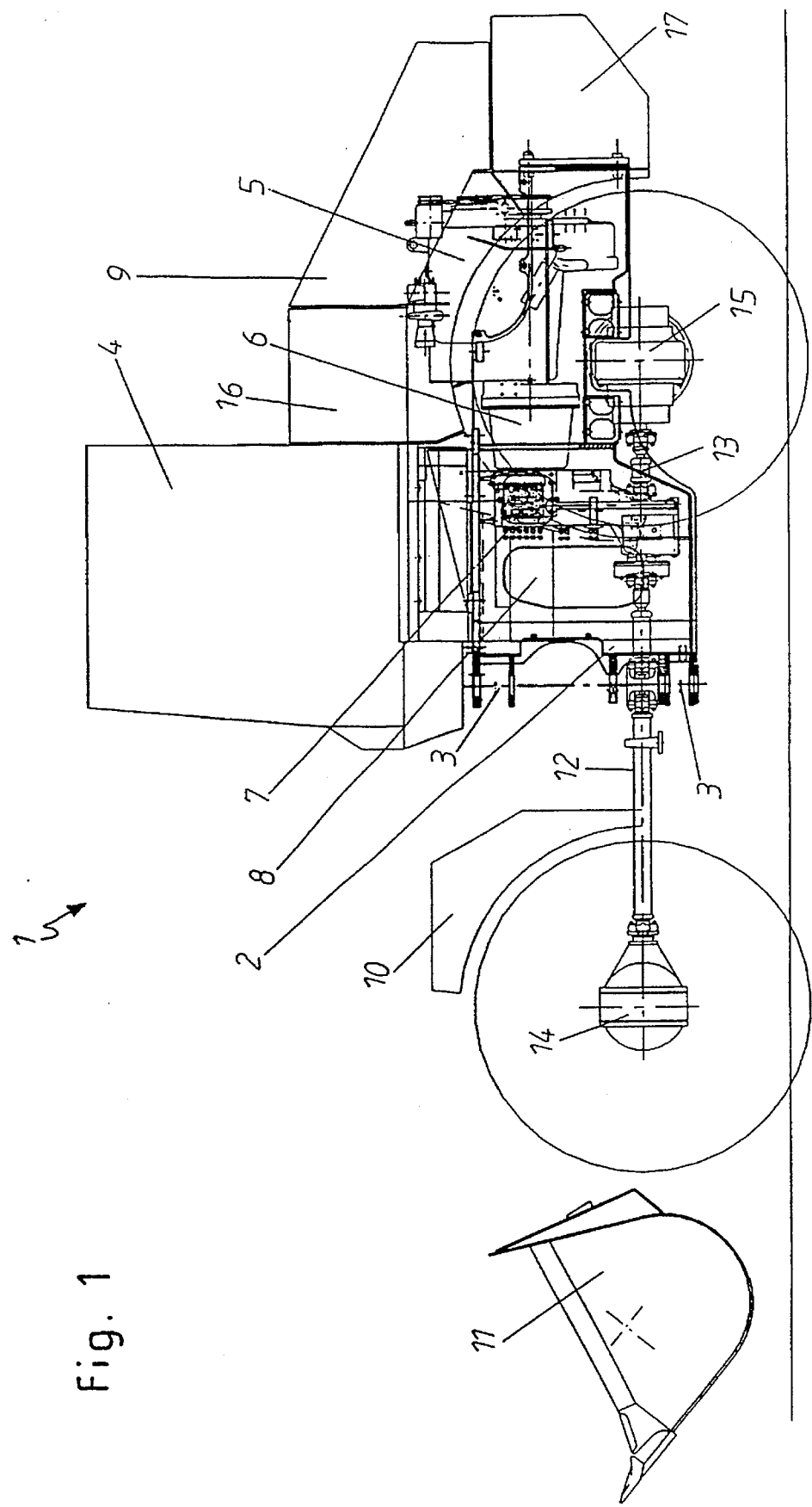
FIG. 1 is a basic sketch of a center pivot steered wheel loader, together with a drive assembly, in the area of the rear frame.

FIG. 1 shows a center pivot steered wheel loader 1 essentially comprising a rear frame 2, a sketched pivot hinge 3, a driver's cab 4 fixed on the rear frame 2, a drive assembly formed by the engine 5, converter 6, transmission 7 and pumps 8, and an engine hood 9. The rear frame 2 is connected via the pivot hinge 3 with the front frame 10, only sketched in, on which a scoop 11 is fixed by means of a lifting mechanism, not shown in detail. Cardan shafts 12, 13 are provided at the output side of the transmission and are connected on the one hand with the front axle 14 and on the other hand with the rear axle 15 of the wheel loader 1. Furthermore, the rear frame 2 also receives the subassembly consisting of the hydraulic oil reservoir 16 and a counterweight 17. The structural design of the rear frame 2 of the center pivot steered wheel loader 1 is represented in FIG. 2.

Figure 2:
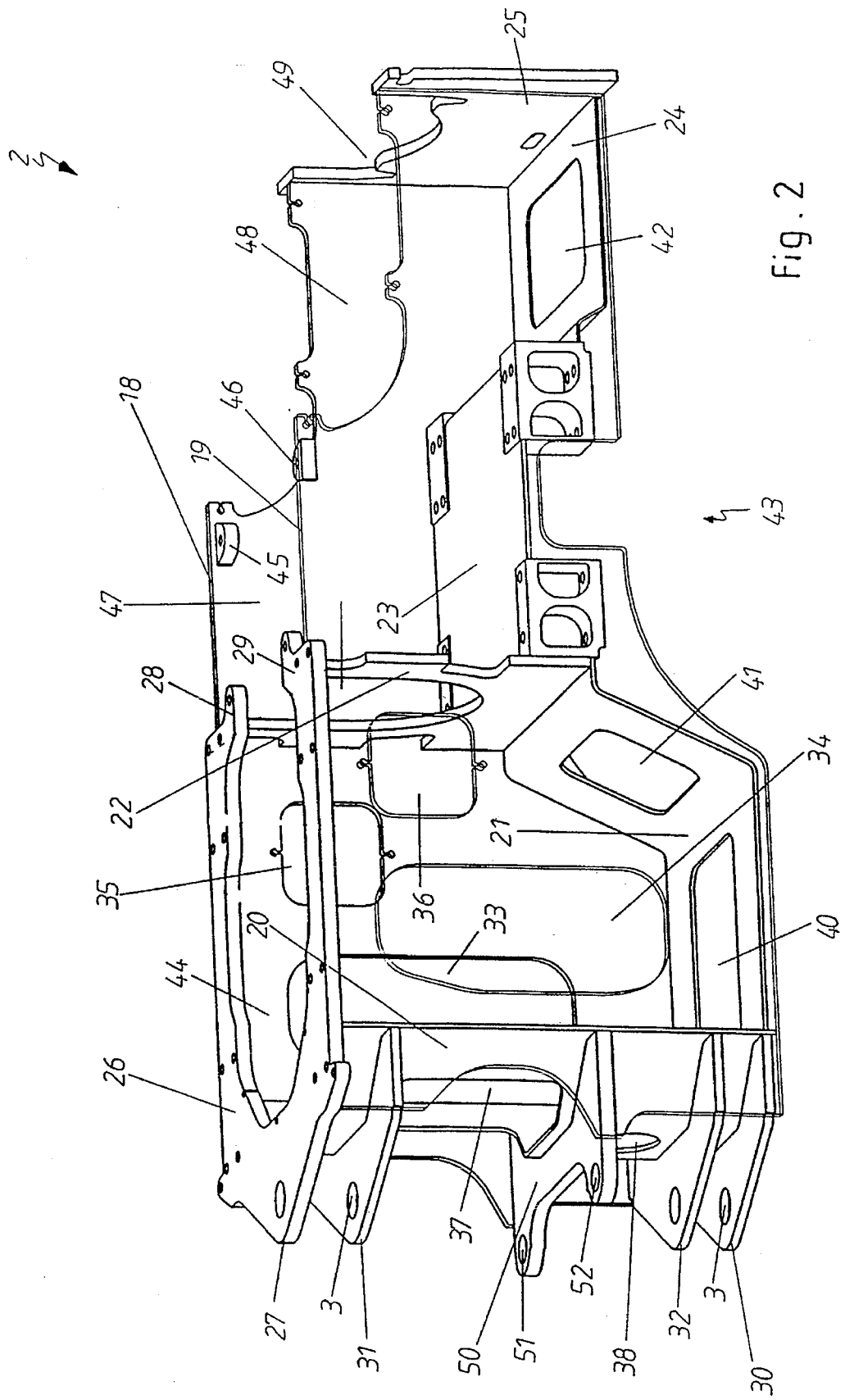
FIG. 2 is a spatial representation of the rear frame in accordance with the invention of the wheel loader of FIG. 1.

FIG. 2 shows in a spatial representation the rear frame 2, embodied as a box comprised of flat side, front, rear and bottom plates, of the center pivot steered wheel loader 1 of FIG. 1, not shown in further detail here. The rear frame 2 consists of lateral surface elements 18, 19 extending in the longitudinal direction and of surface elements 20, 21, 22, 23, 24, extending transversely thereto in different horizontal and/or vertical planes and/or inclined with respect thereof and making possible a linear integration, as well as a rear wall 25. A flange 26 extending to a large degree around the top of the lateral surface elements 18, 19 is provided for receiving the driver's cab 4 of FIG. 1 and constitutes, with its front area 27, a portion of the pivot hinge 3, only sketched in here. In this case the free ends 28, 29 of the flange 26 are facing each other. The same holds true for the transversely extending surface element 21 disposed in the lower area of the lateral surface elements 18, 19, which forms an angle and constitutes a further part of the pivot hinge 3 in its front section 30. Further surface elements 31, 32 are welded to the front wall 20 in the area of the pivot hinge 3, and the pivot parts, not shown in detail, of the pivot hinge 3 are provided between the surface elements 27, 31 and 30, 32. The lateral surface elements 18, 19 as well as the surface elements 20 to 24 extending transversely thereto are provided with function-related openings 33, 34, 35, 36, 37, 38, 39, 40, 41, 42 (only indicated by way of example). The openings 33, 34 are used for maintenance purposes of the assemblies provided in the rear frame 2 and illustrated in FIG. 1, such as the hydraulic pump(s) 8 and the transmission 7. The openings 35, 36 can be provided for maintenance or diagnosing of the hydraulic control block of the wheel loader 1, the opening 37 for letting energy-conducting lines (for example hydraulic hoses) through to the front 10 of the vehicle, the openings 38, 41 for letting the cardan shafts 12, 13 through, and the opening 39 for receiving the converter 6. The further openings 40 and 42 have been cut into the associated transversely extending surface elements 21 and 24 for oil removal from the transmission 7 on the one hand and from the engine 5 on the other hand. In this case the openings 33 to 42 are disposed such that weakening of the cross sections surrounding them is assuredly prevented. Here, the lateral surface elements 18, 19 taper backwards from the pivot hinge 3 in the direction toward the rear wall 25, and the rear axle 15 is attached in the tapered area 43. Following the pre-assembly of the surface elements 18 to 25, the drive assembly shown in FIG. 1 and comprising the engine 5, converter 6, transmission 7 and pumps 8 is inserted as a connected component into the rear frame 2, still open at the top, and connected with the associated elements. Subsequently the subassemblies of, for example, the driver's cab 4, the hydraulic oil reservoir 16 and the counterweight 17, can be attached, wherein the driver's cab 4 is placed on the essentially circumferential flange 26 and in this way closes off the largest portion of the open area 44 located underneath. The hydraulic oil reservoir 16 directly adjoins the driver's cab 4 and is placed on the elements 28, 29 of the flange 26 as well as the shoulders 45, 46 of the lateral surface elements 18, 19 and is connected with them, so that a further area 47, open toward the top, is closed off. The remaining area 48 receiving the engine 5 is tightly closed by the engine hood 9, and lateral wheel boxes, not shown here, are bolted to the lateral surface elements 18, 19. The rear wall 25 is provided with a recess 49 open toward the top, in which the counterweight 17 is suspended, so that this area is also closed. Following assembly of the wheel loader 1, the remaining lateral openings 33 to 36, frontward oriented openings 37, 38 and downward oriented openings 40 to 42 can be sealingly closed by closure elements not further shown here, such as covers, fuel containers, cardan shafts or similar components, so that a box-shaped total structure encapsulated on all sides is formed. Besides a not inconsiderable noise reduction serving as an environmental protection, a possible outflow of leaking fluids is assuredly prevented by these means and the subassemblies located on the inside, such as the engine 5, the converter 6, the transmission 7, the pump(s) 8, cardan shafts 12, 13 or the like are protected from exterior environmental effects. Maintenance intervals can be extended which, in the long run, has positive results in the form of an increased availability of the machinery. To prevent further recesses which had been customary up to now, particularly in the area of the transversely extending surface element 20, for letting steering cylinders (not shown) through, a further component 50 is provided having eyes 51, 52 which are used for seating one end of the steering cylinders and the steering cylinders extend in the direction of the front 10 of the vehicle and are attached there to corresponding components.

The invention now being fully described, it will be apparent to one of ordinary skill in the art that any changes and modifications can be made thereto without departing from the spirit or scope of the invention as set forth herein.

What is claimed:

1. A rear frame for center pivot steered construction machinery, said frame, for receiving adjacent machine parts or subassemblies, being formed of first components which extend in the longitudinal direction of the frame and which are connected with each other via further transversely extending components which extend at least transversely to the first components; and wherein the longitudinally extending first components as well as the further components extending transversely to the first components are respective first and second surface elements which result in a basic structure having a linear integration of the structural parts in the form of a box having at least three contiguous sides and a bottom, the box being closable by at least one of the machinery parts and adjoining subassemblies.

2. A rear frame in accordance with claim 1, wherein the first surface elements extending in the longitudinal direction and the second surface elements extending transversely to the first surface elements are embodied as load bearing parts.

3. A rear frame in accordance with claim 1, wherein the transversely extending second surface elements are disposed in different planes between the first surface elements extending in the longitudinal direction.

4. A rear frame in accordance with claim 3, wherein the transversely extending second surface elements are disposed at least one of horizontally, vertically, and inclined with respect to the longitudinally extending first surface elements.

5. A rear frame in accordance with claim 1, wherein the transversely extending second surface elements are disposed at least one of horizontally, vertically, and inclined with respect to the longitudinally extending first surface elements.

6. A rear frame in accordance with claim 1, wherein the longitudinally extending first surface elements and at least parts of the transversely extending second surface elements are provided with at least one of openings and recesses for letting energy-conducting lines or machine parts through, or for receiving subassemblies, and being sealingly closable.

7. A rear frame in accordance with claims 1, further comprising a pivot hinge located at one end of the frame; wherein the longitudinally extending first surface elements are made in one piece and have an at least partially circumferential flange in the area of said pivot hinge for receiving a driver's cab.

8. A rear frame in accordance with claim 7, wherein the flange constitutes a part of the pivot hinge and extends over a predetermined area of both longitudinally extending surface elements; and wherein the flange has two end areas facing each other.

9. A rear frame in accordance with claim 8, wherein the end areas of the flange, and shoulders of the first surface elements are configured to support a hydraulic oil reservoir adjoining the driver's cab.

10. A rear frame in accordance with claim 1, wherein the surface elements are essentially spatially arranged in respect to each other for at least partially enclosing a pre-assembled drive train, said surface elements including level flange elements for allowing a sealing connection to adjoining machine parts or subassemblies.

11. A rear frame in accordance with claim 7, wherein the longitudinally extending first surface elements taper toward the rear, with the tapered area being essentially disposed behind the flange.

12. A rear frame in accordance with claim 11, wherein one of said surface elements is adapted for stabilizing a rear axle bearing.

13. A rear frame in accordance with claims 12, wherein the tapered area is adapted to receive an engine component, and wherein the tapered area is sealingly closable by an engine hood.

14. A rear frame in accordance with claim 13, further comprising: an area located underneath the flange adapted to receive further drive element; and openings for letting machine parts therethrough, the openings being sealingly closable by one of covers and bearing elements.

15. A rear frame in accordance with claim 13, further comprising: an area located underneath the flange adapted to receive a transmission and pumps.

16. The rear frame assembly defined in claim 8, wherein the two end areas of said flange are located in an area of the rear frame away from said pivot hinge, and are each arranged on a respective first surface element to project toward one another.

17. A rear frame for center pivot steered construction machinery, comprising:

two first surface components each extending in a longitudinal direction, and defining opposite sides of the frame; and a plurality of second surface components each extending transversely to the first surface components, and each being connected to both of the first surface components, wherein said first and second components comprise at least two side plates, a front plate, a rear plate, and a bottom plate connected together to form a box.

18. The rear frame defined in claim 17, wherein at least one of said first and second Surface components has an opening therethrough which is closeable by at least one of machinery parts and adjoining subassemblies.

19. The rear frame defined in claim 17, wherein at least said bottom plate includes a plurality of portions each arranged in different planes.

* * * * *